US006928554B2

(12) United States Patent
Dettinger et al.

(10) Patent No.: US 6,928,554 B2
(45) Date of Patent: Aug. 9, 2005

(54) METHOD OF QUERY RETURN DATA ANALYSIS FOR EARLY WARNING INDICATORS OF POSSIBLE SECURITY EXPOSURES

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/284,944

(22) Filed: Oct. 31, 2002

(65) Prior Publication Data

US 2004/0088561 A1 May 6, 2004

(51) Int. Cl.[7] .......................... G06F 11/30; G06F 12/14; H04C 9/32
(52) U.S. Cl. ................... 713/200; 707/1; 707/9
(58) Field of Search ............... 713/200; 707/1, 707/9

(56) References Cited

U.S. PATENT DOCUMENTS

| | | | |
|---|---|---|---|
| 5,204,961 A | | 4/1993 | Barlow |
| 5,261,102 A | * | 11/1993 | Hoffman .................... 713/200 |
| 5,335,346 A | | 8/1994 | Fabbio |
| 5,355,474 A | | 10/1994 | Thuraisingham et al. |
| 5,481,700 A | | 1/1996 | Thuraisingham |
| 5,560,008 A | | 9/1996 | Johnson et al |
| 5,572,673 A | | 11/1996 | Shurts . |
| 5,577,209 A | | 11/1996 | Boyle et al. |
| 5,694,590 A | * | 12/1997 | Thuraisingham et al. ...... 707/9 |
| 5,768,532 A | | 6/1998 | Megerian |
| 5,859,966 A | | 1/1999 | Hayman et al. |
| 5,933,497 A | | 8/1999 | Beetcher et al. |
| 6,112,181 A | | 8/2000 | Shear et al. |
| 6,226,745 B1 | * | 5/2001 | Wiederhold ................. 713/200 |
| 6,272,488 B1 | | 8/2001 | Chang et al. |

OTHER PUBLICATIONS

Keefe et al.; "Secure Query–Processing Strategies"; Mar. 1989; IEEE; pp. 63–70.*

Couchman, Jason S.; Oracle DBA Certification Exam Guide; 1998; McGraw–Hill Companies, Inc.; pp. 52–97, 100–151, 262–314, 496–522.*

Null et al.; "A Unified Approach For Multilevel Database Secruity Based on Inference Engines"; 1998; ACM; pp. 108–111.*

* cited by examiner

Primary Examiner—Gilberto Barrón, Jr.
Assistant Examiner—Jung Kim
(74) Attorney, Agent, or Firm—Moser, Patterson & Sheridan, LLP

(57) ABSTRACT

System, method and article of manufacture for securing data. Queries are analyzed to detect security violation efforts. In one embodiment, algorithms for detecting selected security violation patterns are implemented. Generally, patterns may be detected prior to execution of a query and following execution of a query. Illustrative patterns include union query analysis, pare down analysis, non-overlapping and others.

46 Claims, 10 Drawing Sheets

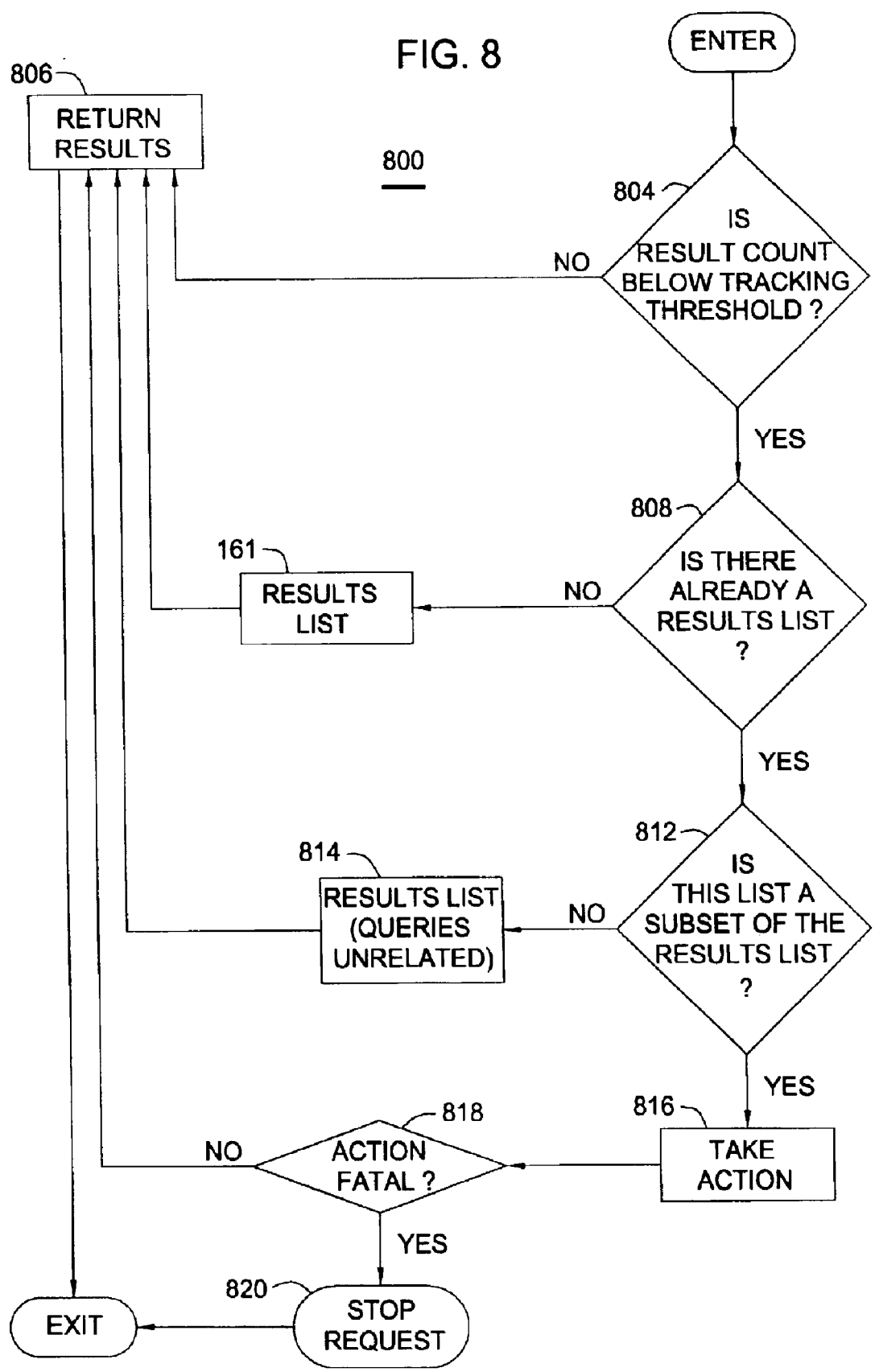

METHOD OF QUERY RETURN DATA ANALYSIS FOR EARLY WARNING INDICATORS OF POSSIBLE SECURITY EXPOSURES

BACKGROUND OF THE INVENTION

1. Field of the Invention

The present invention generally relates to data processing and more particularly to methods of protecting a database from inappropriate or unauthorized access.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One significant issue in the context of databases is security. Databases often contain confidential or otherwise sensitive material which require a degree of security to be protected from access. For example, medical records are considered highly personal and confidential. As such, access to medical records is typically restricted to selected users. To this end, conventional database management systems may implement user profiles which specify a level of authority. Whether a user may access some particular data will depend upon the user's level of authority specified in their respective profile.

However, the foregoing approach is highly inflexible and static. In practice, such an approach may prevent users from accessing a broader range of data than is desirable. As a result, the effectiveness of a database may be substantially limited. On the other hand, if security is too relaxed sensitive data may be compromised. What is needed is a balance of data accessibility and security.

To illustrate the shortcomings of conventional databases, consider, for example, a medical database in which the only results users are permitted to see are clinic numbers, in order to ensure anonymity of patients having records in the database. A user may still be able to determine the identity of patients with a fair degree of certainty by issuing a series of carefully crafted queries using information already known to the user. Such a process is referred to herein as query union analysis. The following is an illustrative series of queries designed to identify a particular individual according to a clinic number (which is an identifier uniquely identifying an individual) and a number of unique patient records that each query returns:

| Query | Results |
| --- | --- |
| People diagnosed with Alzheimer's in 1998 | 1200 |
| People married and living in California | 6000 |
| People living between the ages of 70 and 80 | 14,000 |
| People with clinic visits in 1999 and 2001, but not in any other years | 6000 |

Taken independently, each of the foregoing queries returns a reasonable number of results. Collectively, however, the number of results which satisfy each of the conditions will be significantly smaller, perhaps only one person. Having determined a clinic number for one individual, a user may run any query that returns clinic numbers and any other information, and identify which information corresponds to the one individual.

The foregoing is merely one example of how users may exploit conventional databases. A variety of other subversive techniques may be used to bypass security mechanisms in place to protect data contained in databases.

Therefore, there is a need for improved security mechanisms for databases.

SUMMARY OF THE INVENTION

The present invention generally is directed to a method, system and article of manufacture for database security.

In one embodiment, a method of providing security with respect to data is provided. One embodiment comprises receiving a query issued against a database by a user; and determining whether a security violation pattern exists based on at least one of: (i) pre-execution comparative analysis of the query with respect to at least one other previously issued query from the user; and (ii) post-execution comparative analysis of results returned from execution of the query and results returned from execution of the at least one other previously issued query.

Another method of providing security with respect to data comprises receiving a plurality of plurality queries from a user; executing the plurality of queries against a database; receiving a subsequent query issued against the database by the user; and based on the plurality of queries and the subsequent query, programmatically determining whether a user effort to access an unauthorized amount of data from the database is identifiable.

Another method of providing security with respect to data comprises receiving a plurality of queries from a user; executing the plurality of queries against a database; receiving a subsequent query issued against the database by the user; executing the subsequent query; and based on the plurality of queries and the subsequent query, programmatically determining whether a user effort to bypass security constraints preventing unique identification of individuals is identifiable.

Another method provides for security of data having a particular physical data representation, the method comprising providing a query specification comprising a plurality of logical fields for defining abstract queries; providing mapping rules which map the plurality of logical fields to physical entities of the data; providing security rules; receiving an abstract query issued against the data by a user, wherein the abstract query is defined according to the query specification and is configured with at least one logical field value; and analyzing the abstract query with respect to the at least one previously received abstract query from the user to detect an existence of security violation activity prompting invocation of a security rule.

Yet another embodiment provides a computer-readable medium containing instructions which, when executed, perform a security violation identification operation, comprising: receiving a query issued against a database by a user; and determining whether a security violation pattern exists based on at least one of: (i) pre-execution comparative analysis of the query with respect to at least one other previously issued query from the user; and (ii) post-execution comparative analysis of results returned from execution of the query and results returned from execution of the at least one other previously issued query.

Yet another embodiment provides a computer-readable medium containing security validation instructions which, when executed, performs a security validation operation comprising: receiving a plurality of queries from a user; executing the plurality of queries against a database; receiving a subsequent query issued against the database by the user; executing the subsequent query; and based on the plurality of queries and the subsequent query, programmatically determining whether a user effort to bypass security constraints preventing unique identification of individuals is identifiable.

Still another embodiment provides a computer-readable medium, comprising information stored thereon, the information comprising: a query specification comprising a plurality of logical fields for defining abstract queries; a plurality of mapping rules which map the plurality of logical fields to physical entities of data; a plurality of security rules; a runtime component executable to perform a security violation activity detection operation in response to receiving an abstract query issued against the data by a user, wherein the abstract query is defined according to the query specification and is configured with at least one logical field value. The security violation activity detection operation comprises receiving an abstract query issued against the data by a user, wherein the abstract query is defined according to the query specification and is configured with at least one logical field value; and analyzing the abstract query with respect to at least one previously received abstract query from the user to detect an existence of security violation activity prompting invocation of a security rule.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8 is a flow chart illustrating the operation of a runtime component identify and handle pare down analysis using post-execution results analysis.

DETAILED DESCRIPTION OF THE PREFERRED EMBODIMENTS

Introduction

Figure 1:
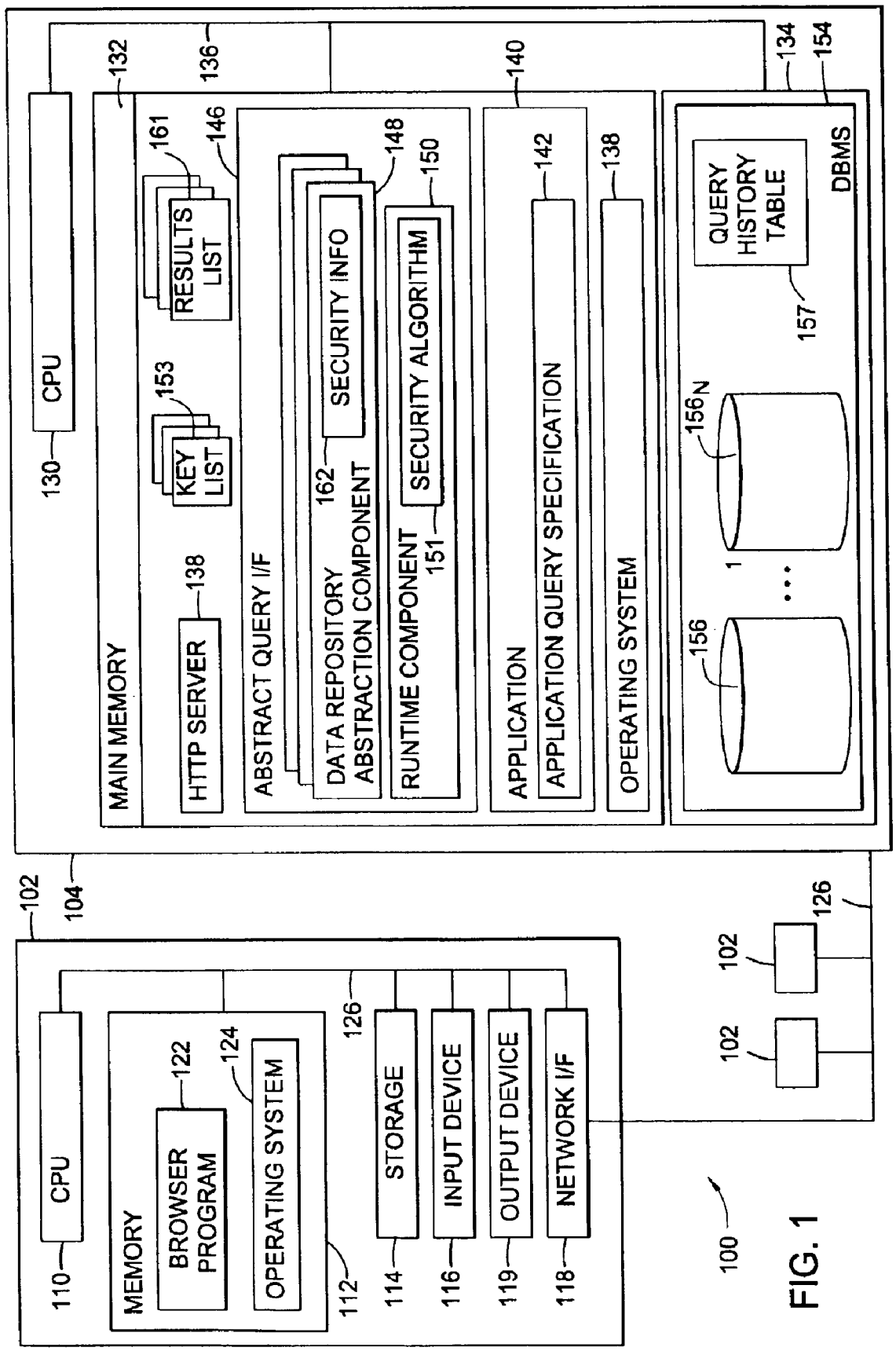
FIG. 1 is one embodiment of a computer system.

The present invention generally is directed to a system, method and article of manufacture for determining users' unauthorized attempts to access data. In general, analysis is performed on a query prior to execution and/or analysis is performed on results returned by execution of the query. In one embodiment, the detection of a possible security violation causes one or more security measures to be taken. For example, in one embodiment a user's query is not executed. In another embodiment, the event is logged and/or an administrator is notified of the event.

In one embodiment, security features are implemented as part of a logical model of data. The logical model is implemented as a data repository abstraction layer, which provides a logical view of the underlying data repository. In this way, data is made independent of the particular manner in which the data is physically represented. A query abstraction layer is also provided and is based on the data repository abstraction layer. A runtime component performs translation of an abstract query into a form that can be used against a particular physical data representation. However, while the abstraction model described herein provides one or more embodiments of the invention, persons skilled in the art will recognize that the concepts provided herein can be implemented without an abstraction model while still providing the same or similar results.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed, disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any program (preferably GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138, shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed/executed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154.

In one embodiment, the data repository abstraction component 148 is configured with security information 162. For embodiments not based on the abstraction model (or some equivalent thereof), the security information may reside elsewhere. In one embodiment, the security information 162 includes keys associated with one or more fields. Aspects of such keys will be described in more detail below.

The runtime component 150 operates to perform various analyses and, in some embodiments, enforce various security features or take other actions according the results of the analyses performed. Accordingly, the runtime component 150 is shown configured with a security algorithm 151 (which may be representative or a plurality of algorithms), which implements the methods described herein. In general, the security features implemented by the runtime component 150 may be applied to a particular user, a group of users or all users.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

Logical/Runtime View of Environment

Figure 2A:
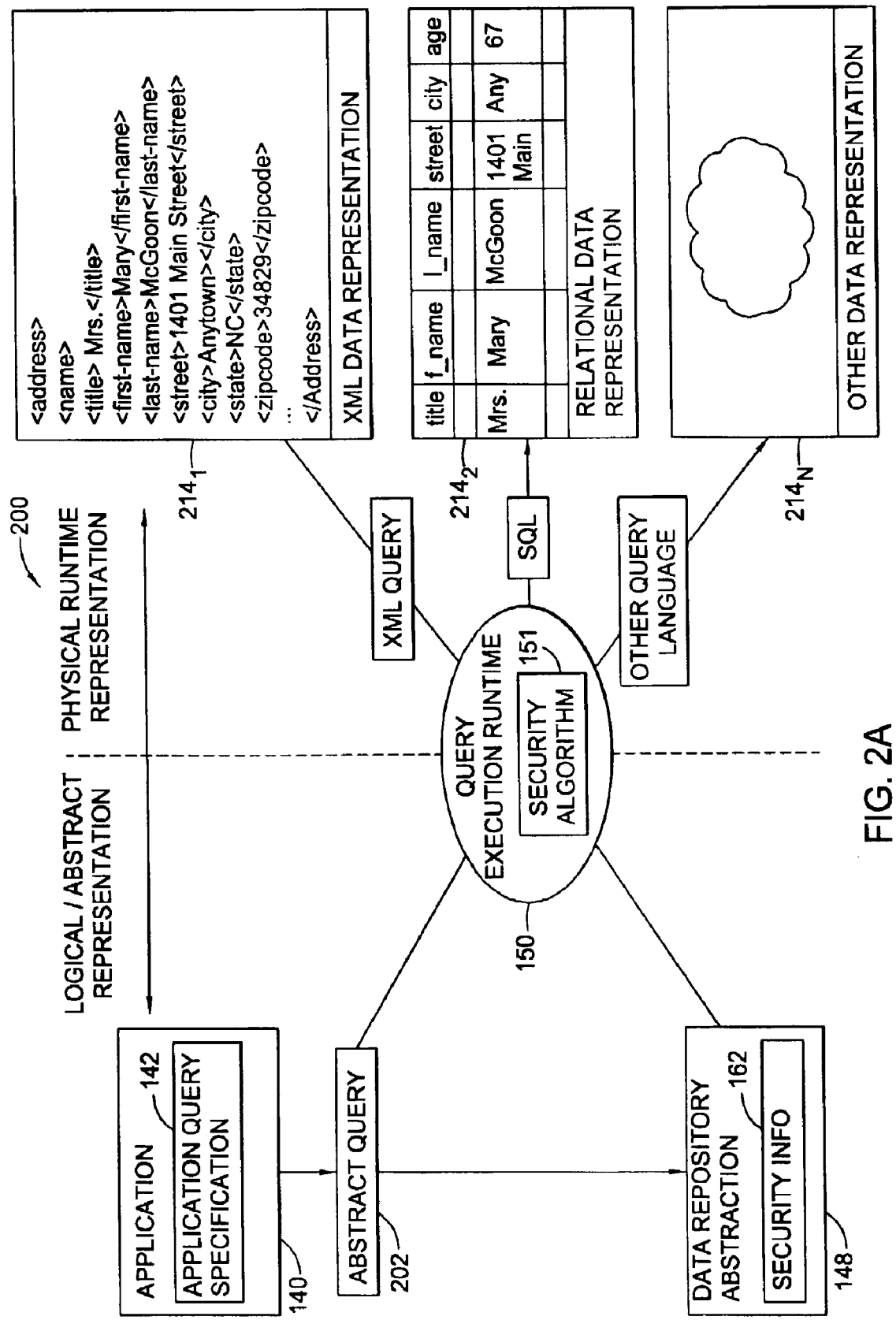
FIG. 2A is a logical/physical view of software components of one embodiment of the invention.
Figure 2B:
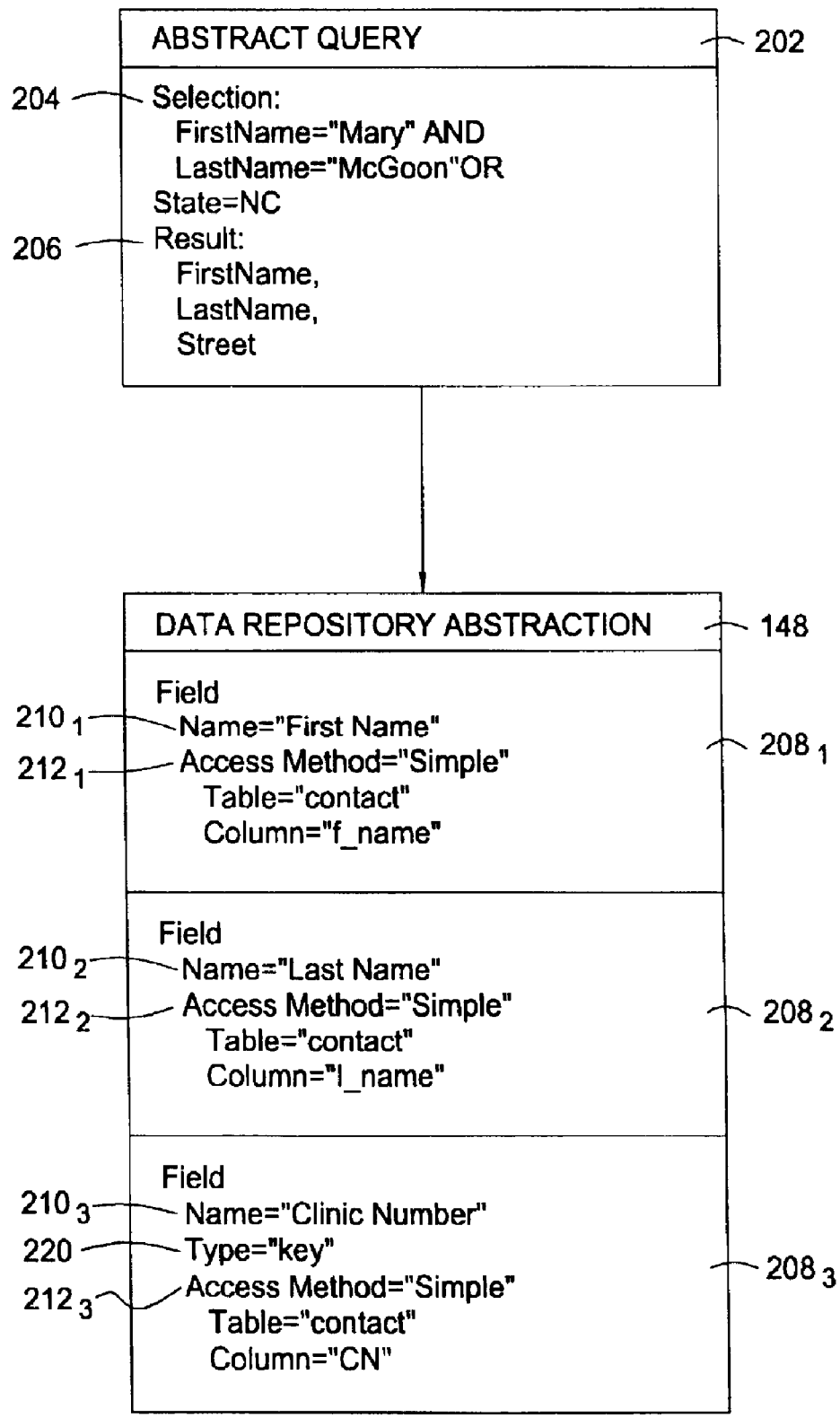
FIG. 2B is a logical view of an abstract query and a data repository of abstraction.

FIGS. 2A–B show an illustrative relational view 200 of components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

An illustrative abstract query corresponding to the abstract query 202 shown in FIG. 2B is shown in Table I below. By way of illustration, the abstract query 202 is defined using XML. However, any other language may be used to advantage.

TABLE I

QUERY EXAMPLE

```
001  <?xml version="1.0"?>
002  <!--Query string representation: (FirstName = "Mary" AND LastName =
003  "McGoon") OR State = "NC"-->
004  <QueryAbstraction>
005     <Selection>
006        <Condition internalID="4">
007           <Condition field="FirstName" operator="EQ" value="Mary"
008  internalID="1"/>
009           <Condition field="LastName" operator="EQ" value="McGoon"
010  internalID="3" relOperator="AND"></Condition>
011        </Condition>
012        <Condition field="State" operator="EQ" value="NC" internalID="2"
013  relOperator="OR"></Condition>
014     </Selection>
015     <Results>
016        <Field name="FirstName"/>
017        <Field name="LastName"/>
018        <Field name="State"/>
019     </Results>
020  </QueryAbstraction>
```

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 (which may be in response to user input query conditions) to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 comprises a plurality of field specifications $208_1, 208_2, 208_3$, ... (three shown by way of example), collectively referred to as the field specifications 208. Specifically, a field specification is provided for each logical field available for composition of an abstract query. In one embodiment, a field specification 208 comprises a logical field name $210_1, 210_2, 210_3$ (collectively, field name 210) and an associated access method $212_1, 212_2, 212_1$ (collectively, access method 212).

The access methods 212 associate (i.e., map) the logical field names to a particular physical data representation $214_1, 214_2 \ldots 214_N$ in a database (e.g., one of the databases 156). By way of illustration, two data representations are shown in FIG. 2A, an XML data representation $214_1$ and a relational data representation $214_2$. However, the physical data representation $214_N$ indicates that any other data representation, known or unknown, is contemplated.

In one embodiment, a single data repository abstraction component 148 contains field specifications (with associated access methods) for two or more physical data representations 214. In an alternative embodiment, a different single data repository abstraction component 148 is provided for each separate physical data representation 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148.

Any number of access methods are contemplated depending upon the number of different types of logical fields to be supported. In one embodiment, access methods for simple fields, filtered fields and composed fields are provided. The field specifications $208_1, 208_2$ and $208_3$ exemplify simple field access methods $212_1, 212_2$ and $212_3$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". Filtered fields (no example shown in FIG. 2) identify an associated physical entity and provide rules used to define a particular subset of items within the physical data representation. An example of a filtered field is a New York ZIP code field that maps to the physical representation of ZIP codes and restricts the data only to those ZIP codes defined for the state of New York. Composed access methods (no example shown in FIG. 2) compute a logical field from one or more physical fields using an expression supplied as part of the access method definition. In this way, information which does not exist in the underlying data representation may computed. An example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

In one embodiment, one or more of the field specifications 208 are configured with the security information 162 briefly described above with reference to FIG. 1. In the illustrated embodiment, only the field definition 2083 has associated security information 162. Accordingly, it should be understood that not all field definitions need necessarily include security information. In the present example, the security information is a type attribute 220 having the value "key". It should be understood that the key value need not be designated in the data repository abstraction 148, but could instead be a value in a configuration file, for example. In operation, a session-specific list 153 (a plurality of which are shown in FIG. 1) is maintained for each field having a key and which the user has included in at least one query. Specifically, the list 153 (e.g., a hash table) contains all values that have been returned from the associated field for a particular session. Accordingly, in general, the size list for a given user grows for each query which returns results not previously returned (i.e., non-overlapping query results). In one embodiment, the list may be persistent, while in another embodiment the list is deleted when a user logs out or after a period of user inactivity. A query results analysis may then be performed, as will be described in more detail below. In some cases, an action(s) is taken according to a security action definition 213. Illustrative actions are described below.

Table II shows an illustrative Data Repository Abstraction component corresponding to the data repository abstraction component 148 shown in FIG. 2B. By way of illustration, the Data Repository Abstraction 148 is defined using XML. However, any other language may be used to advantage.

TABLE II

DATA REPOSITORY ABSTRACTION EXAMPLE

```
<?xml version="1.0"?>
<DataRepository>
  <Category name="Demographic">
    <Field queryable="Yes" name="FirstName" displayable="Yes">
```

TABLE II-continued

DATA REPOSITORY ABSTRACTION EXAMPLE

```
        <AccessMethod>
            <Simple column Name="f_name" tableName="contact"></Simple>
        </AccessMethod>
        <Type baseType="char"></Type>
    </Field>
    <Field queryable="Yes" name="LastName" displayable="Yes">
        <AccessMethod>
            <Simple columnName="L_name" tableName="contact"></Simple>
        </AccessMethod>
        <Type baseType="char"></Type>
    </Field>
    <Field queryable="Yes" name="Clinic Number" displayable="Yes">
        <AccessMethod>
            <Simple columnName="CN" tableName="contact"></Simple>
        </AccessMethod>
        <Type baseType="char" key="true"></Type>
        <Security>
            <SecurityRule>
                <User>All</User>
                <Action> RunAndLog</Action>
            </SecurityRule>
            <SecurityRule>
                <User> securityOfficers </User>
                <Action> RunAndLog </Action>
            </SecurityRule>
            <SecurityRule>
                <User> cujo </User>
                <Action> NoAction </Action>
            </SecurityRule>
        </Security>
    </Field>
  </Category>
</DataRepository>
```

Figure 3A:
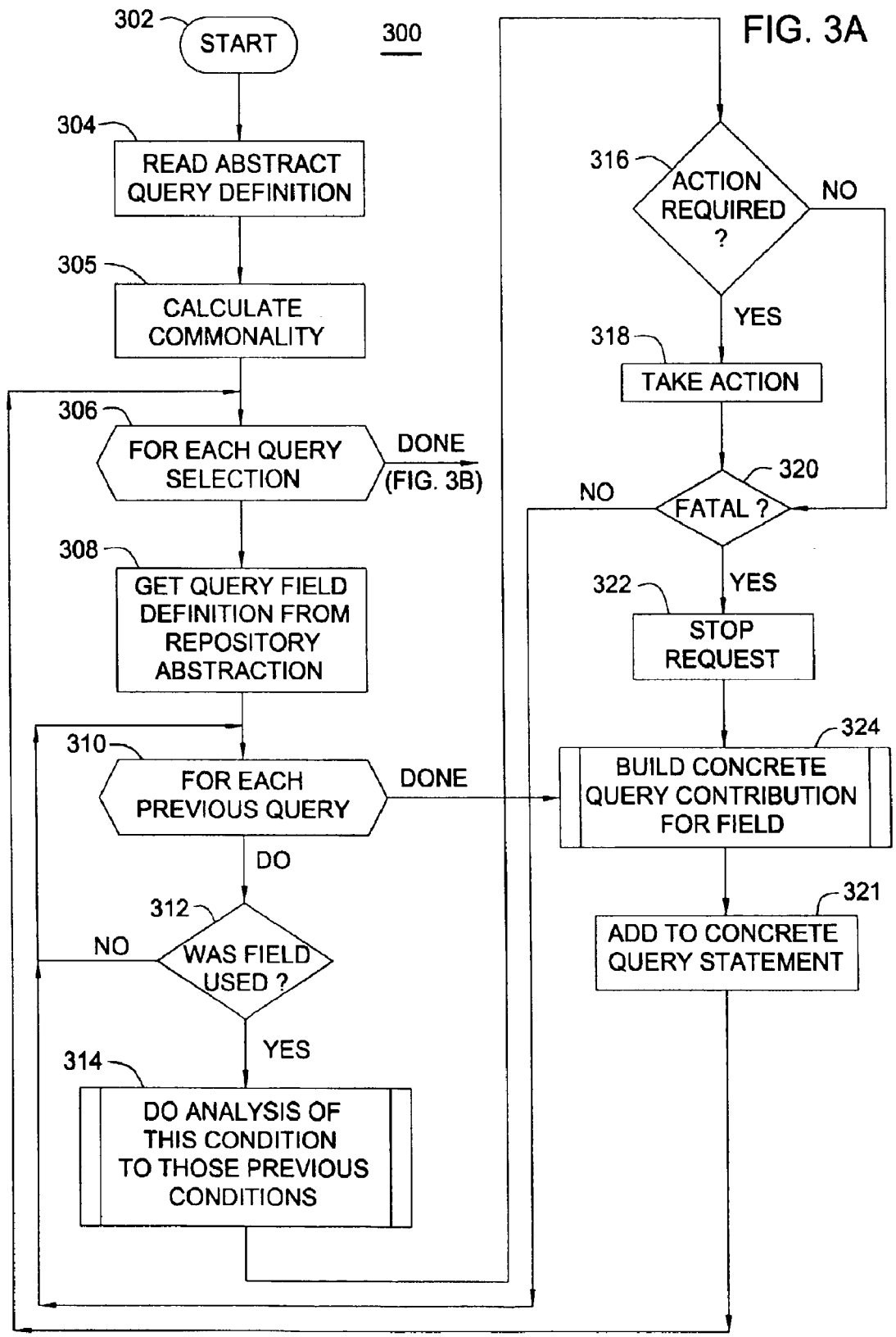
FIGS. 3A and 3B are a flowchart illustrating the operation of a runtime component.
Figure 3B:
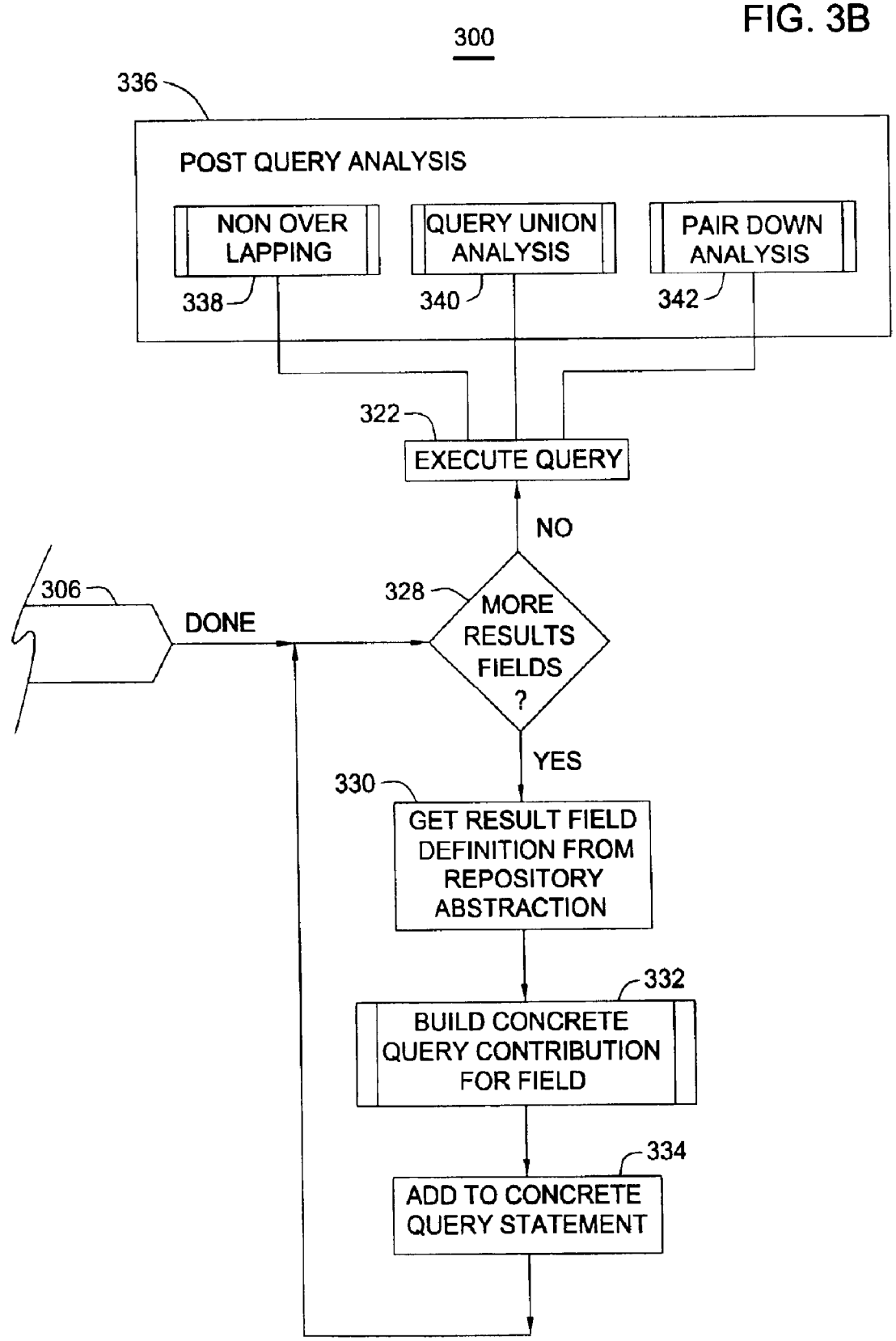

FIGS. 3A and 3B show an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 309 some preliminary statement structure analysis is performed which will be use to advantage with post-execution result analysis, as described below. Specifically, at step 309 a query commonality value is calculated. The query commonality value is calculated by determining the relative commonality between the current query and all previous queries. For example, if one query has two conditions, clinic number >x and zip code=y, and another query for the same user has two conditions, clinic number <1000 and diagnosis=z, then the two queries have 50% commonality.

At step 306, the runtime component 150 enters a loop for processing each query selection criteria statement present in the abstract query, thereby building a data selection portion of a Concrete Query. In one embodiment, a selection criterion (also referred to herein as a condition) consists of a field name (for a logical field), a comparison operator (=, >, <, etc) and a value expression which the field is being compared to. At step 308, the runtime component 150 uses the field name from a selection criterion of the abstract query to look up the definition of the field in the data repository abstraction 148. As noted above, the field definition includes a definition of the access method used to access the physical data associated with the field.

Beginning at step 310 further steps are taken to perform statement structure analysis. Specifically, at step 310 a loop is entered for each previous query. That is, a query history table 157 (FIG. 1) is accessed and traversed. In general, the query history table 157 is a list of queries that have been run. The query history table 157 is populated with a new entry each time a new query is run. In one embodiment, this data structure contains the SQL query in its abstract form. The data structure can be configured as to when the history is released. One option for releasing the history is when the session is ended. Another is after a certain time period has passed. At step 312, the runtime component 150 determines whether the field of the query selection being processed (step 306) was used in the previous query retrieved from the historical query table 157 at step 310. If not, the method 300 returns to step 310 and the runtime component 150 retrieves another previous query from the historical query table 157. When a previous query having the field of the query selection being processed (step 306) is identified, analysis is performed (step 314) with respect to the query selection and the identified previous query. At step 316, the runtime component 150 determines whether the results of the analysis (at step 314) require some action to be taken. In one embodiment, the actions are specified in the data repository abstraction component 148 (see Table II). Security actions include logging the user's query(s) (or other pertinent information), preventing the query from being executed, and/or ending the user's session. More generally, persons skilled in the art will recognize that any variety of responses may be taken when a security rule is invoked. For example, a notification (e.g., by e-mail) to a system administrator may be issued. Note that In the example illustrated in Table II. security actions are defined for Individual users (e.g., Cujo), groups of users (e.g., security officers) and all users. In one embodiment, where multiple actions exist for a particular field, the action most narrowly tailored to a user is applied. Thus, an action specific to an individual user overrides all other actions and an action specific to a group overrides an action specified for all users. An action specified for all users is applied only if no other more narrowly tailored action for the user exists. If step 316 is answered negatively (i.e., no action is required), processing returns to step 310 where another previous query is retrieved from the historical query table 157 for examination. If an action is required at step 316, the action is taken at step 318. If the action is fatal (step 320), the user's query is not executed (step 322). Otherwise, processing returns to step 310. Once each previous query in the historical query table 157 has been examined for the presence of the field of the current query selection being processed, the method 300 proceeds to step 324.

The runtime component 150 then builds (step 324) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 328 (defined by steps 328, 330, 332 and 334) to add result field definitions to the concrete query being generated. At step 330, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 332) a Concrete Query Contribution (of the concrete query that identifies physical location of data to be returned) for the logical result field. At step 334, Concrete Query Contribution is then added to the Concrete Query Statement. Once each of the result specifications in the abstract query has been processed, the query is executed at step 336.

Figure 4:
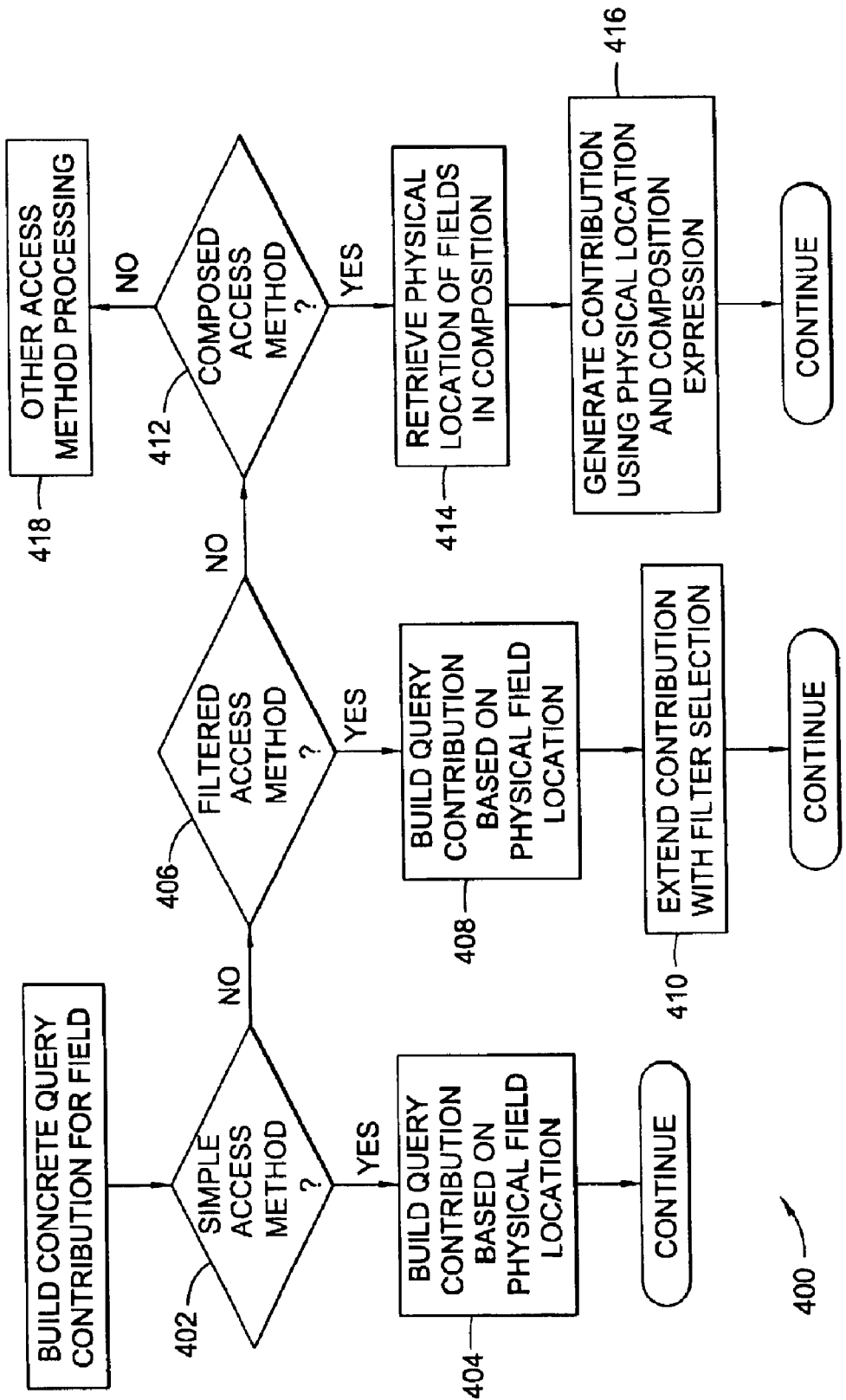
FIG. 4 is a flowchart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Figure 5:
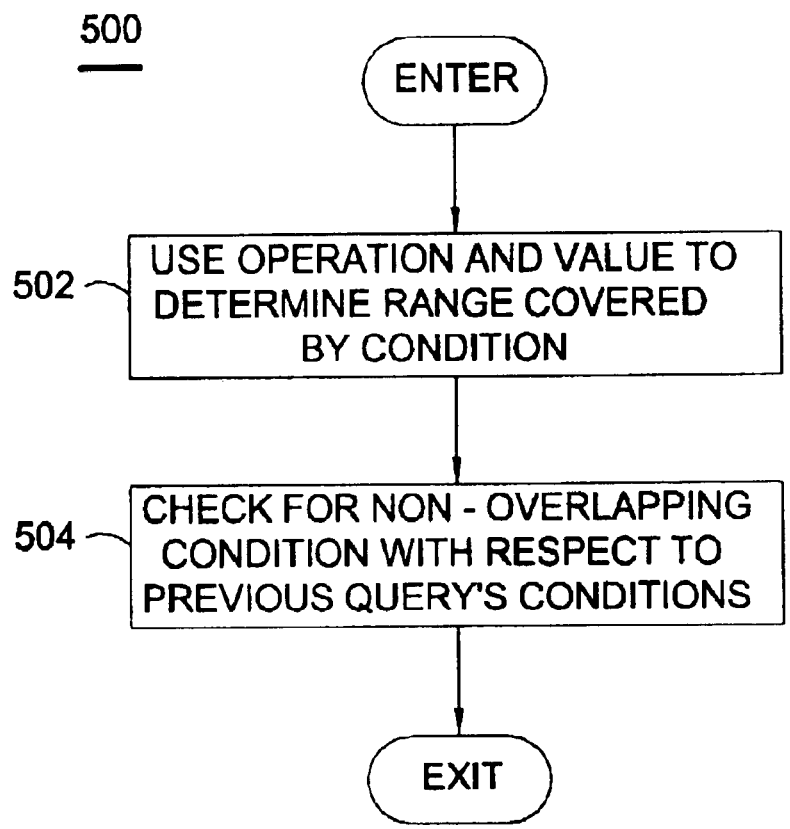
FIG. 5 is a flow chart illustrating the operation of a runtime component to identify and handle non-overlapping conditions using pre-execution analysis.

Referring to FIG. 5 a method 500 is shown which illustrates one embodiment of the analysis performed at step 314. Recall that the analysis is performed on a selection/condition having the general format <field><operator><value>. At step 502, the operator and value are used to determine the range covered by the query selection. At step 504, the runtime component 150 checks for a non-overlapping condition with respect to the conditions of the previous query retrieved from the historical query table 157 at step 310. In one embodiment, a non-overlapping condition is defined as a condition with a common field of earlier queries but which does not return any of the results (rows) returned by earlier queries. Consider, for example, a previous query (the conditions for which are stored in the historical query table 157) having the range condition "age >=0 AND age<5". Assume now that the query being analyzed contains the range condition "age >=5 AND age <10". These query conditions evidence a pattern which suggests that a user is scanning large portions of a database by consciously crafting queries designed to avoid returning any of the same rows. In another embodiment, a non-overlapping condition is defined as a condition with a common field of earlier queries and which returns some new results (i.e., results not returned by previous queries) and some old results (i.e., results returned by previous queries). A repeated pattern of such non-overlapping conditions may also be identified as an unauthorized attempt to access/accumulate a portion of the database.

If a non-overlapping condition is identified, the condition is handled at steps 316/318. In one embodiment, the non-overlapping condition is handled according to administrator settings. In particular, the number of unrelated queries which must be identified before some action is taken may be specified by administrator settings. Further, one embodiment may allow for some degree of overlapping or separation in the conditions. Thus, conditions between two queries which have some nominal number of results in common may still considered non-overlapping. In such a case it may be desirable to base a determination of non-overlapping on the range covered by conditions of different queries. For example, where the total range of results of some group of queries having a related field is 4000 and the actual number of overlapping results which would be returned by conditions is 4, the queries/conditions are substantially non-overlapping. On the other hand, where the total range of results of some group of queries having a related field is 40 and the number of overlapping results which would be returned by the queries is 30, the queries/conditions may be considered substantially overlapping. For purposes of claim construction, the term "non-overlapping" queries/conditions should be construed to include substantially non-overlapping queries/conditions. Additionally or alternatively, the number of different patients for which results may be returned may be defined by administrator settings. In one embodiment, such administrator settings may be made specific to particular users. Thus, a first user may be given more access to data while a second user's access may be relatively more restricted.

Figure 6:
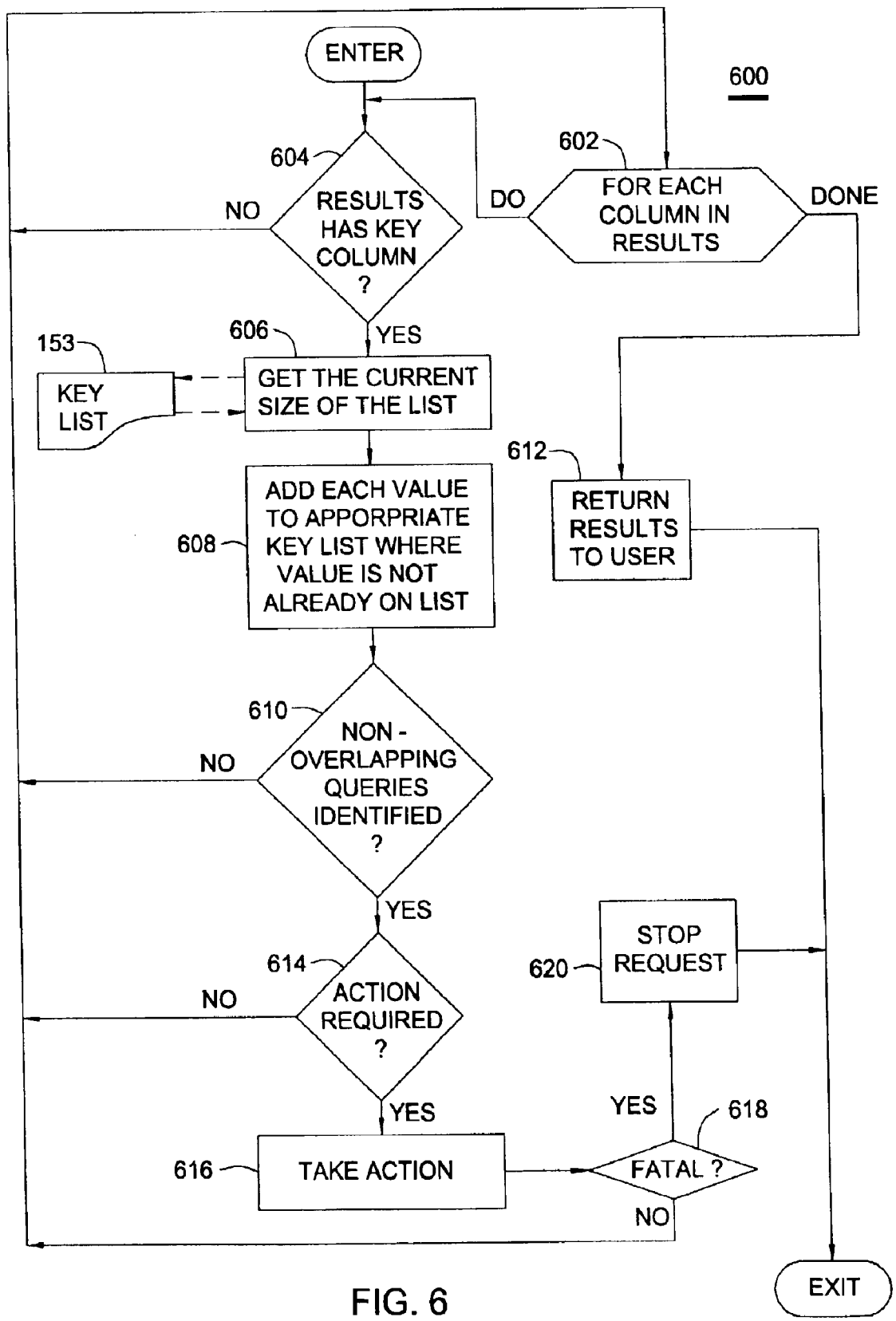
FIG. 6 is a flow chart illustrating the operation of a runtime component identify and handle non-overlapping conditions using post-execution results analysis.

The foregoing exemplifies pre-execution analysis. Additional or alternative aspects include post-execution analysis following execution of a query at step 336 of FIG. 3B. Illustrative post-execution analyses are represented by blocks 338, 340, and 342. In general, post-execution analyses include processing performed after execution of a query and before or/and after the results of an executed query are returned to a user. For example, block 338 represents a non-overlapping query analysis performed before providing the results to a user. One embodiment of a method 600 for performing the non-overlapping query analysis of block 338 Is shown in FIG. 6. Initially, the runtime component 150 enters a loop at step 602, which is performed for each column of the results. At step 604, the runtime component 150 determines whether the column is a key column (that is, a column for which a key has been defined). If not, the next column of the results is similarly processed. If the results do include a key column, the current size of the list 153 corresponding to the key column is retrieved (step 606). Each value in the results not already contained in the list 153 is added to the list 153 (step 608). At step 610, the runtime component 150 determines whether non-overlapping queries are identified. In the illustrative embodiment, step 610 includes determining whether the key list's size after adding each new value (step 608) is equal to the sum of the number of new results/values and the list's original size (retrieved at step 606). An affirmative determination in this regard indicates that no new values were returned by the query and added to the list 153 (In which case, the query executed at step 336 is not overlapping with respect to previous queries).

As noted previously with regard to pre-execution analysis, some degree of overlap may nevertheless be considered substantially non-overlapping in some cases. This principle may be applied to post-execution analysis. Thus, results between two queries which have some nominal number of results in common may still considered non-overlapping. In such a case it may be desirable to base a determination of non-overlapping on the number of total results returned. For example, where the total results of some group of queries having a related field is 4000 and the number of overlapping results is 4, the queries are substantially non-overlapping. On the other hand, where the total results of some group of queries having a related field is 40 and the number of overlapping results is 30, the queries may be considered substantially overlapping. For purposes of claim construction, the term "non-overlapping" queries/results should be construed to include "substantially" non-overlapping queries/results. If the query executed at step 336 is determined to be overlapping or substantially overlapping, the results are marked (step 611) for return to the user, and processing continues with the next column. Otherwise, the runtime component 150 determines (step 614) whether some predefined action is required (examples of which have been described above). If so, the action is taken at step 616. If the action is fatal (determined at step 618), the request is terminated and the results are not returned to the user (step 620). The method 600 then exits. If the action is not fatal, the processing returns to step 602 where processing of the next column begins. If all columns are successfully processed without invoking a fatal action, then all results are returned to the user at step 612.

As an example of post-execution query analysis to identify non-overlapping queries, considered a user who runs a first query which returns 1000 different clinic numbers. The 1000 different clinic numbers are tracked in the appropriate key list 153 for clinic numbers. The user then runs a second query which returns 1500 different clinic numbers. Assuming that the first query and the second query return completely unique results, the key list 153 for clinic numbers would then contain 2500 different clinic numbers and the queries are determined to be non-overlapping. If the results returned by the queries share at least one common value, steps may be taken to determine whether the queries are nevertheless substantially non-overlapping (as described above). More generally, any variety of configurable settings may be employed to determine a pattern of non-overlapping queries and avoiding premature fatal action (i.e. preventing the results from being returned to the user). For example, the number of non-overlapping key values which may be returned prior to taking action may be predefined. Alternatively or additionally, the number of non-overlapping or substantially non-overlapping queries which may be executed prior to taking action may be predefined. Persons skilled in the art will recognize other rules which may be used to advantage.

It should be noted that the use of a predefined key is merely one embodiment for performing various types of query analysis. More generally, any approach which allows tracking of commonality between queries is contemplated. For example, an alternative to a predefined key is examining a series of queries by the same user to determine the presence of a common field. The common field may then be designated and used as a key by which trend analysis (e.g., determination of non-overlapping queries) may be performed.

Figure 7:
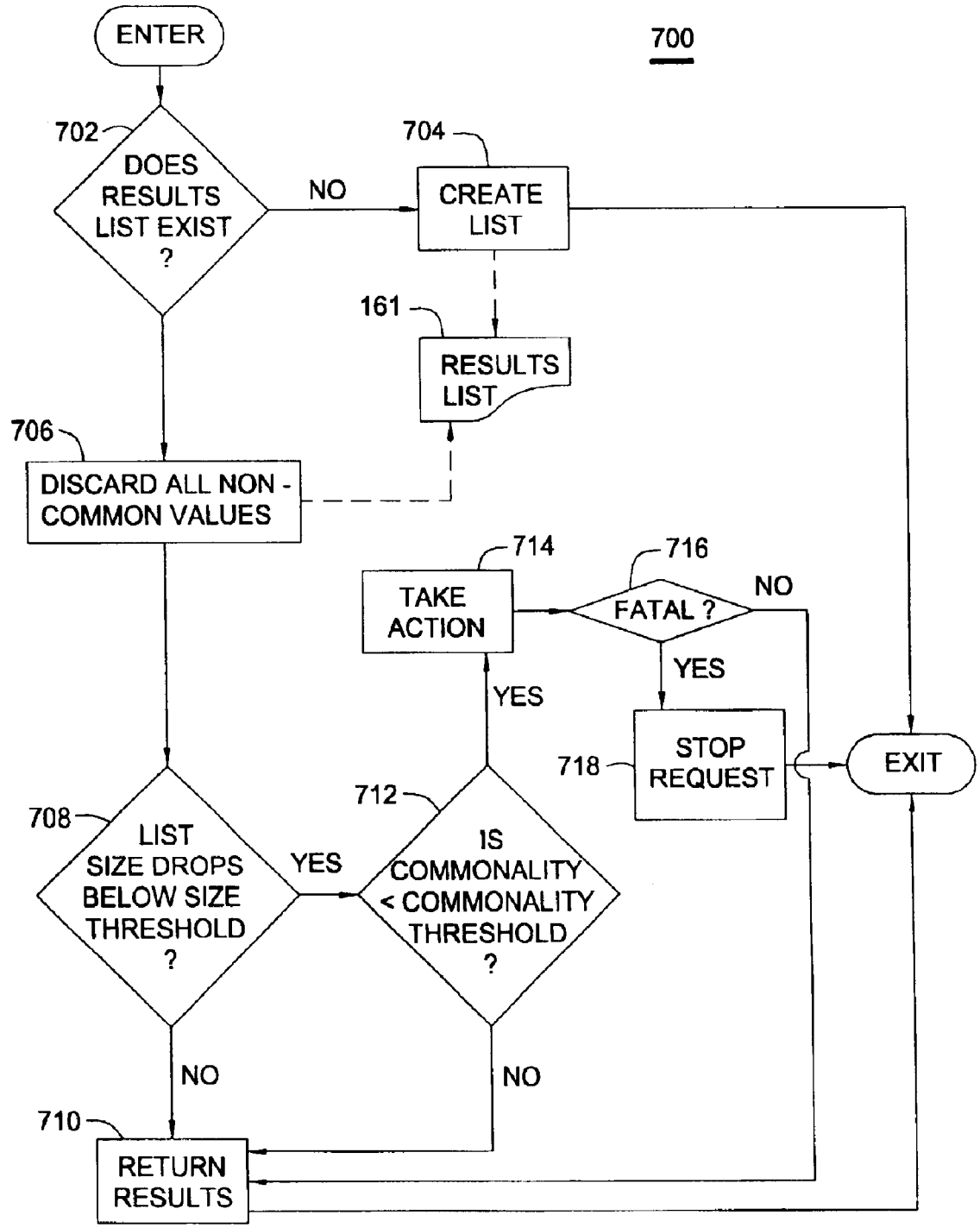
FIG. 7 is a flow chart illustrating the operation of a runtime component identify and handle query union analysis using post-execution results analysis.

Another type of post-execution query analysis is represented by block 340 in FIG. 3B, and referred to herein as query union analysis detection. An example of query union analysis has been provided above. Generally, query union analysis detection examines a sequence of queries and determines a pattern of apparently unconnected queries (i.e., made up of different conditions) which, nevertheless, contain one or more common result values in a decreasing result set. One embodiment for detecting and handling query union analysis is the method 700 shown in FIG. 7, which is entered following execution of the query. At step 702, the security algorithm 151 determines whether a results list exists for tracking the results of queries. If not, a results list 161 is created and the results are stored therein (step 704). The method 700 then exits. If, however, a results list already exists, the algorithm 151 operates to discard all non-common values from the results list 161. That is, all values contained in the results list 161 which are not also part of the results returned from executing the query, are removed from the results list 161. At step 708, the algorithm 151 determines whether the results list size has dropped below a size threshold (where, in one embodiment, the size threshold is customizable). If not, the results are returned to the user (step 710) and the method 700 exits. Otherwise, the algorithm 151 determines whether the commonality value (determined at step 305 of FIG. 3A) is less than a commonality value threshold (step 712). If not, the results are returned to the user (step 710) and the method 700 exits. Otherwise, a predefined security action is taken at step 714. If the security action is fatal (determined at step 716), the user's request is stopped, and the method 700 exits. If the security action is not fatal, the results are returned to the user (step 710) and the method 700 exits.

Another type of post-execution query analysis is represented by block 342 in FIG. 3B, and is referred to herein as pare down analysis detection. Pare down analysis refers to the process of running a broad query that returns a relatively large number of rows and then continuously and systematically sub-setting the initial results with subsequent queries. In one aspect, pare down analysis is a variation on union query analysis; both approaches advantageously utilize information known to a user to restrict the size of results returned. Consider a user who issues a first query for people with Alzheimer's. Looking at the results returned by execution of the first query, the user determines that a greater degree of specificity can be achieved by restricting the query to those people living in California. Accordingly, a second query for people with Alzheimer's and living in California is issued by the user. Subsequently, the user further restricts the query to people of a specific age. The user may continue this pattern of sub-setting over any number of queries in order to reduce the number of results returned.

FIG. 8 shows one embodiment of a post-execution pare down detection method 800, which is entered after executing a query and receiving results. At step 804, the runtime component 150 determines whether the result count is below a tracking threshold. Illustratively, the tracking threshold is a predefined value selected according to when pare down detection should be performed. That is, pare down detection is not performed if the result count is above the tracking threshold, in order to give the user some degree of searching capability. Therefore, if step 804 is answered negatively, the results of the query execution are returned to the user (step 806). If, however, the result count is below the tracking threshold, the runtime component 150 determines whether one or more result lists 161 (FIG. 1) already exist from previous invocations of the pare down detection method. Generally, a result list 161 contains the results of an executed query for purposes of performing pare down detection. If (at step 808) a results list does not yet exist, the current results are stored in a results list 161 (step 810) and are then returned to the user (step 806). If at least one results list 161 does exist, then the runtime component 150 determines whether the current results are a subset of any one of the existing results lists (step 812). If not, the current results are stored in a separate results list (step 814). Accordingly, multiple results list may exist, each containing sets of unrelated results returned for different queries. If, however, the current results are a subset of one of the existing results lists, a pattern of paring down has been detected and a security action is invoked (step 816). Illustrative security actions have been described above. If the security action is fatal (determined at step 818) the current results are not returned to the user and the user may be prevented from executing any further queries (step 820). If the security action is not fatal, the results may be returned to the user (step 806).

In the above-described pare down method 800, a paring down pattern may be detected after only two queries, assuming the result count of both queries is below the tracking threshold (determined at step 804). However, it should be understood that the specific criteria for detecting a paring down pattern is configurable. For example, the pare down algorithm may require (in addition to a result count below a tracking threshold) that the paring down pattern span some number, N, of queries, where N is >2. Further, the pare down algorithm may require that the paring down pattern occur over sequential/consecutive queries. Persons skilled in the art will recognize other criteria which may be used to advantage.

In one embodiment, a "hot list" is used to advantage. The hot list contains selected individuals who merit a higher level of security. In one embodiment, a single hot list is used for all queries, regardless of the user. Such an approach may be useful where the individuals listed in the hot list are celebrities. In another embodiment, the hot lists are personalized to each user, such that the lists contain individuals known to the respective user. In this way, searches by a particular user directed to one or more individuals on the user's hot list can be detected and handled to preserve anonymity and confidentiality.

As noted above, the data repository abstraction component 148 is merely illustrative of one embodiment which provides various advantages. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case where a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

With regard to the end user, the data repository abstraction provides a data filtering mechanism, exposing pertinent data and preventing access to selected content. However, it should be understood that the data repository abstraction is merely one embodiment of the invention. More generally, the invention is implemented in any manner which provides for execution (or non-execution) of a query according to a user-data dependency. That is, query execution is made dependent on the end user and particular data which would be accessed/returned by the query upon execution.

However, it should be emphasized that persons skilled in the art will readily recognize that the security features and mechanisms of the invention may be implemented separately from the data repository abstraction component. For example, in the context of conventional relational databases, one embodiment uses the structures from a query parser, which would reside in the database engine to run the analysis described herein.

While the foregoing is directed to embodiments of the present invention, other and further embodiments of the invention may be devised without departing from the basic scope thereof, and the scope thereof is determined by the claims that follow.

What is claimed is:

1. A method of providing security with respect to data, comprising:
   receiving a query issued against a database by a user; and
   determining whether a security violation pattern exists based on:
   (i) pre-execution comparative analysis of the query with respect to at least one other previously issued query from the user; and
   (ii) post-execution comparative analysis of results returned from execution of the query and results returned from execution of the at least one other previously issued query.

2. The method of claim 1, wherein the at least one other previously issued query includes only those queries from a current logon session of the user.

3. The method of claim 1, wherein determining whether the security violation pattern exists based on step (i), comprises determining a relative commonality between the query and the at least one other previously issued query.

4. The method of claim 3, wherein determining whether the security violation pattern exists based on step (i), further comprises:
   determining whether the relative commonality is less than a predefined value; and
   if so, invoking a security rule.

5. The method of claim 3, wherein determining whether the security violation pattern exists based on step (ii), further comprises:
   determining whether a number of common results between the results returned from execution of the query and the results returned from execution of the at least one other previously issued query decreased;
   if so, determining whether the relative commonality is less than a predefined value, and if so, invoking a security rule.

6. The method of claim 1, wherein determining whether the security violation pattern exists based on step (i), comprises detecting that common query conditions of the query and the at least one other previously issued query are configured to return non-overlapping results.

7. The method of claim 1, wherein determining whether the security violation pattern exists based on step (i), comprises detecting a user's attempt to acquire an unauthorized amount of a database as characterized by a presence of one or more common query conditions of the query and the at least one other previously issued query configured to return at least partially non-overlapping results.

8. The method of claim 1, wherein determining whether the security violation pattern exists based on step (i) is performed only if the query and the at least one other previously issued query are configured to access a common table column.

9. The method of claim 1, wherein determining whether the security violation pattern exists based on step (ii), comprises detecting the results returned from execution of the query and the results returned from execution of the at least one other previously issued query are non-overlapping.

10. The method of claim 1, wherein determining whether the security violation pattern exists based on step (ii), comprises detecting a pattern of results subsetting.

11. The method of claim 1, further comprising, if the security violation pattern exists, invoking a security rule.

12. The method of claim 11, wherein invoking the security rule upon determining that the security violation pattern exists after performing step (i), comprises terminating the query.

13. The method of claim 11, wherein invoking the security rule upon determining that the security violation pattern exists after performing step (ii), comprises withholding from the user the results returned from execution of the query.

14. A method of providing security with respect to data, comprising:
   receiving a plurality of queries from a user;
   executing the plurality of queries against a database;
   receiving a subsequent query issued against the database by the user; and
   based on the plurality of queries and the subsequent query, programmatically determining whether a user effort to access an unauthorized amount of data from the database is identifiable, wherein programatically determining comprises detecting that common query conditions of the subsequent query and the plurality of queries are configured to return at least partially non-overlapping results.

15. A method of providing security with respect to data, comprising:
   receiving a plurality of queries from a user;
   executing the plurality of queries against a database;
   receiving a subsequent query issued against the database by the user;
   executing the subsequent query; and
   based on the plurality of queries and the subsequent query, programmatically determining whether a user effort to bypass security constraints preventing unique identification of individuals is identifiable.

16. The method of claim 15, wherein programmatically determining comprises:
   determining a relative commonality between the subsequent query and the plurality of queries;

determining whether a number of common results between results returned from execution of the subsequent query and the results returned from execution of the plurality of queries decreased;

if so, determining whether the relative commonality is less than a predefined value, and if so, invoking a security rule.

17. The method of claim 15, wherein programmatically determining comprises detecting a pattern of results subsetting.

18. A method of providing security to data having a particular physical data representation, comprising:

providing a query specification comprising a plurality of logical fields for defining abstract queries;

providing mapping rules which map the plurality of logical fields to physical entities of the data;

providing security rules;

receiving an abstract query issued against the data by a user, wherein the abstract query is defined according to the query specification and is configured with at least one logical field value; and analyzing the abstract query with respect to the at least one previously received abstract query from the user to detect an existence of security violation activity prompting invocation of a security rule.

19. The method of claim 18, wherein analyzing the abstract query and the at least one previously received abstract query from the user to detect an existence of security violation activity comprises performing a pre-execution comparative analysis of the abstract query and at least one other previously issued abstract query from the user.

20. The method of claim 18, wherein analyzing the abstract query and the at least one previously received abstract query from the user to detect an existence of security violation activity comprises performing a post-execution comparative analysis of results returned from execution of the abstract query and results returned from execution of the at least one other previously issued abstract query.

21. The method of claim 18, further comprising:

detecting the existence of the security violation activity; and invoking the security rule.

22. A computer-readable medium containing instructions which, when executed, perform a security violation identification operation, comprising:

receiving a query issued against a database by a user; and determining whether a security violation pattern exists based on
(i) pre-execution comparative analysis of the query with respect to at least one other previously issued query from the user; and
(ii) post-execution comparative analysis of results returned from execution of the query and results returned from execution of the at least one other previously issued query.

23. The computer-readable medium of claim 22, wherein the at least one other previously issued query includes only those queries from a current logon session of the user.

24. The computer-readable medium of claim 22, wherein determining whether the security violation pattern exists based on step (i), comprises determining a relative commonality between the query and the at least one other previously issued query.

25. The computer-readable medium of claim 24, wherein determining whether the security violation pattern exists based on step (i), further comprises:

determining whether the relative commonality is less than a predefined value; and if so, invoking a security rule.

26. The computer-readable medium of claim 24, wherein determining whether the security violation pattern exists based on step (ii), further comprises:

determining whether a number of common results between the results returned from execution of the query and the results returned from execution of the at least one other previously issued query decreased;

if so, determining whether the relative commonality is less than a predefined value, and if so, invoking a security rule.

27. The computer-readable medium of claim 22, wherein determining whether the security violation pattern exists based on step (i), comprises detecting that common query conditions of the query and the at least one other previously issued query are configured to return non-overlapping results.

28. The computer-readable medium of claim 22, wherein determining whether the security violation pattern exists based on step (i), comprises detecting a user's attempt to acquire an unauthorized amount of a database as characterized by a presence of one or more common query conditions of the query and the at least one other previously issued query configured to return at least partially non-overlapping results.

29. The computer-readable medium of claim 22, wherein determining whether the security violation pattern exists based on step (i) is performed only if the query and the at least one other previously issued query are configured to access a common table column.

30. The computer-readable medium of claim 22, wherein determining whether the security violation pattern exists based on step (ii), comprises detecting the results returned from execution of the query and the results returned from execution of the at least one other previously issued query are non-overlapping.

31. The computer-readable medium of claim 22, wherein determining whether the security violation pattern exists based on step (ii), comprises detecting a pattern of results subsetting.

32. The computer-readable medium of claim 22, further comprising, if the security violation pattern exists, invoking a security rule.

33. The computer-readable medium of claim 32, wherein invoking the security rule upon determining that the security violation pattern exists after performing step (i), comprises terminating the query.

34. The computer-readable medium of claim 32, wherein invoking the security rule upon determining that the security violation pattern exists after performing step (ii), comprises withholding from the user the results returned from execution of the query.

35. A computer-readable medium containing security validation instructions which, when executed, performs a security validation operation comprising:

receiving a plurality of plurality queries from a user;

executing the plurality of queries against a database;

receiving a subsequent query issued against the database by the user; and based on the plurality of queries and the subsequent query, programmatically determining whether a user effort to access an unauthorized amount of data from the database is identifiable, wherein programatically determining comprises detecting that common query conditions of the subsequent query and the plurality of queries are configured to return at least partially non-overlapping results.

36. A computer-readable medium containing security validation instructions which, when executed, performs a security validation operation comprising:

receiving a plurality of queries from a user;

executing the plurality of queries against a database;

receiving a subsequent query issued against the database by the user;

executing the subsequent query; and based on the plurality of queries and the subsequent query, programmatically determining whether a user effort to bypass security constraints preventing unique identification of individuals is identifiable.

37. The computer-readable medium of claim 36, wherein programmatically determining comprises:

determining a relative commonality between the subsequent query and the plurality of queries;

determining whether a number of common results between results returned from execution of the subsequent query and the results returned from execution of the plurality of queries decreased;

if so, determining whether the relative commonality is less than a predefined value, and if so, invoking a security rule.

38. The computer-readable medium of claim 36, wherein programmatically determining comprises detecting a pattern of results subsetting.

39. A computer-readable medium, comprising information stored thereon, the information comprising:

a query specification comprising a plurality of logical fields for defining abstract queries;

a plurality of mapping rules which map the plurality of logical fields to physical entities of data;

a plurality of security rules;

a runtime component executable to perform a security violation activity detection operation in response to receiving an abstract query issued against the data by a user, wherein the abstract query is defined according to the query specification and is configured with at least one logical field value, the security violation activity detection operation comprising:

analyzing the abstract query with respect to at least one previously received abstract query from the user to detect an existence of security violation activity prompting invocation of a security rule.

40. The computer-readable medium of claim 39, wherein analyzing the abstract query and the at least one previously received abstract query from the user to detect an existence of security violation activity comprises performing a pre-execution comparative analysis of the abstract query and at least one other previously issued abstract query from the user.

41. The computer-readable medium of claim 39, wherein analyzing the abstract query and the at least one previously received abstract query from the user to detect an existence of security violation activity comprises performing a post-execution comparative analysis of results returned from execution of the abstract query and results returned from execution of the at least one other previously issued abstract query.

42. The computer-readable medium of claim 39, further comprising:

detecting the existence of the security violation activity; and invoking the security rule.

43. The computer-readable medium of claim 39, wherein the security rule prevents execution of the abstract query.

44. The computer-readable medium of claim 39, wherein the security rule is defined to log receipt of the abstract query from the user.

45. The computer-readable medium of claim 39, wherein, using the plurality of mapping rules, the abstract queries are converted into executable queries having a format consistent with the physical entitles of data.

46. The computer-readable medium of claim 39, wherein the physical entities of data are defined by a schema.

* * * * *